United States Patent Office 3,496,230
Patented Feb. 17, 1970

3,496,230
PROCESS FOR MIXTURE OF MONO- AND DIALKYL-DIPHENYLAMINES
Earl Kaplan, Metuchen, N.J., assignor to American Cyanamid Company, Stamford, Conn., a corporation of Maine
No Drawing. Filed Feb. 17, 1966, Ser. No. 528,068
Int. Cl. C07c 87/50, 87/54
U.S. Cl. 260—576
3 Claims

ABSTRACT OF THE DISCLOSURE

A process for preparing a mixture of mono- and dialkyldiphenylamines having at least 60% of the dialkyl-diphenylamine by reacting in the presence of a Friedel-Crafts catalyst, diphenylamine with dissobutylene or nonene at atmospheric pressure and within respective temperature ranges of 120–135° C. and 140–160° C., wherein between 2 and 4 moles of diisobutylene or nonene are employed per mole of diphenylamine.

---

This invention relates to an improved method for the manufacture of mixtures of mono-alkyl- and dialkyl-diphenylamine, the alkyl groups of which contain 8 or 9 carbon atoms.

Mono- and dioctyl- and nonyl-diphenylamines are useful as antioxidants and stabilizers for rubber, plastics, petroleum products, etc. Though the dialkyl-diphenyl-amines are usually the preferred compounds, commercial dialkyldiphenylamine products often contain minor amounts of the corresponding mono-alkyl-diphenyl-amines.

Heretofore, the octyl- and nonyl-diphenylamines, and in particular the dialkyl derivatives, have been made by reacting diphenylamine with an alkene in the presence of a Friedel-Crafts condensation catalyst. The reaction, in the past, has been carried out at super-atmospheric pressure, and at a temperature above 150° C. See, for example, U.S. Patent 2,776,994.

There are well-recognized difficulties and costs associated with using pressure vessels and it is therefore desirable to have processes which do not require the use of such vessels. It is an object of this invention to provide such a process.

In accordance with this invention, it has now been discovered that mixed mono- and dialkyl-diphenylamines, can be obtained by a process which does not require the use of a pressure vessel. In the process of this invention, diphenylamine and an alkene of 8 or 9 carbon atoms is reacted under reflux conditions in the presence of a Friedel-Crafts condensation catalyst such as aluminum chloride or zinc chloride. The new process offers advantages over the previous processes: (1) elimination of costly pressure equipment and the high maintenance costs, (2) ease of operation, (3) ability to alter the ratio of mono- to dialkyl derivatives after the reaction is started.

In carrying out the process of this invention, the diphenylamine and catalyst are charged to the reactor. All of the alkene can then be added to the reactor and the mixture heated to the reflux temperature, or the alkene can be added in small portions or continuously while heating to and at the reflux temperature. The alkenes are diisobutylene for the octyl derivative and nonene for the nonyl derivative. Between 2 and 4 moles, preferably between 2.25 and 3 moles, of alkene are used per mole of diphenylamine. The ratio of dialkyl-diphenylamine to mono-alkyl-diphenylamine in the final product is largely dependent on the amount of alkene employed. The above ratios of alkene to diphenylamine permit the preparation of products containing a major proportion (at least 60%) of dialkyl-diphenylamine. The ratio of alkene to diphenylamine can be varied during the heating period as desired. It is not as easily done when pressure equipment is used.

In the case of the octyl derivative, the reaction temperature is maintained between 120° and 135° C., preferably between 125–130° C. The temperature range for the nonyl derivative is 140–160° C., preferably between 145–150° C. The product is less desirable when temperatures above 135° C. and 160° C., respectively, are employed.

The reaction is continued until analysis shows that the desired degree of alkylation has taken place. By the process of this invention, it is possible to obtain products having a dialkyl content of at least 80%.

The products can be isolated by any of several methods. It is convenient to treat the reaction mixture with aqueous alkali to remove acidic materials and then to heat the organic material under reduced pressure to remove water and unreacted alkene. When the product is a solid at room temperature, the warm molten material can be flaked. Otherwise, it is obtained as a liquid.

In the following examples, the parts and percentages are by weight.

EXAMPLE 1

Dioctyldiphenylamine production

A reaction mixture containing 169.2 parts (1.0 mole) of diphenylamine, 336.6 parts (3.0 moles) of diisobutylene and 13.3 parts (0.1 mole) of aluminum chloride is heated at 120° C. for six hours. The resulting product is washed with 169 parts of 25% aqueous sodium hydroxide and then several times with water. Volatile materials, including excess diisobutylene, are removed by heating the product to 130° C. under a vacuum. The product, a major part of which is dioctyldiphenylamine, is crystallized in pans or flaked on a commercial flaker.

EXAMPLE 2

Dinonyldiphenylamine production

A reaction mixture containing 42.5 parts of diphenylamine, 91.5 parts of nonene, and 5.3 parts of aluminum chloride is refluxed at a temperature of 130–140° C. until the rate of reflux diminishes. The reaction is then continued at 140–150° C. until the reaction is completed (about five hours) as indicated by an analysis of about 80% dinonyldiphenylamine, 15% mono-nonyldiphenyl-amine and about 2% diphenylamine. The reaction mixture is added to 100 parts of water containing 14.8 parts of 50% aqueous sodium hydroxide. The lower aqueous layer is separated, the upper oily layer is washed twice with 100 parts of water and the washes are separated. The oily layer is then distilled at about 130° C. in vacuo, removing excess nonene. The product is a liquid.

EXAMPLE 3

Dioctyldiphenylamine production

To a suitable reaction vessel is charged 1,000 parts of diphenylamine, 100 parts of aluminum chloride and 1625 parts of diisobutylene. The mixture is heated to the reflux point of 125–130° C. Then 480 parts of diisobutylene are added and reflux is continued until analysis of the reaction mixture shows that there is not more than 0.5% of unreacted diphenylamine, less than 8.0% of mono-octyldiphenylamine, and not less than 83.0% dioctyldiphenylamine. The reaction mixture is then transferred to a vessel containing 2,500 parts of water and 156 parts of 50% sodium hydroxide while keeping the temperature below 85° C. After heating at 80–90° C. for about 10 minutes, the aqueous layer is removed and the oily layer is washed with water. The oil is then subjected to a vacuum evaporation to remove excess diisobutylene and any water present. The product is then flaked.

EXAMPLE 4

To a suitable reactor is charged 1,050 parts of diphenylamine, 125 parts of aluminum chloride and 2760 parts of nonene. The mixture is heated to the reflux point of 145–150° C. and heating is continued until analysis shows that not more than 25% mono-nonyldiphenylamine and not less than 60% of di-nonyldiphenylamine are present in the reaction mixture. The reaction mixture is transferred to a vessel containing 2,500 lbs. of water and 348 parts of 50% sodium hydroxide solution and is heated at 80–90° for about 10 minutes while adding more sodium hydroxide, if necessary, to maintain alkalinity to phenolphthalein paper. The lower aqueous layer is separated by decantation and the upper oily layer is washed with water. After separating the water, the oily layer is subjected to vacuum evaporation to remove excess nonene and water, thereby yielding the product.

I claim:

1. A process for preparing a mixture of mono- and dialkyldiphenylamines having at least 60% of the dialkyldiphenylamine which comprises reacting, in the presence of a Fridel-Crafts catalyst diphenylamine with diisobutylene or nonene at atmospheric pressure and within respective temperature ranges of 120–135° C. and 140–160° C., wherein between 2 and 4 moles of diisobutylene or nonene are employed per mole of diphenylamine.

2. The process of claim 1 wherein diphenylamine and diisobutylene are reacted at atmospheric pressure and within a temperature range of 120–135° C.

3. The process of claim 1 wherein diphenylamine and nonene are reacted at atmospheric pressure and within a temperature range of 140–160° C.

References Cited
UNITED STATES PATENTS

| | | | |
|---|---|---|---|
| 2,776,994 | 1/1957 | Wolfe et al. | 260—576 |
| 3,278,602 | 10/1966 | Peeler | 260—576 |

CHARLES B. PARKER, Primary Examiner

CHARLES F. WARREN, Assistant Examiner

U.S. Cl. X.R.

260—45.9